(12) United States Patent
Andrews

(10) Patent No.: US 12,030,368 B2
(45) Date of Patent: Jul. 9, 2024

(54) COMPRESSOR SYSTEMS AND METHODS FOR USE BY VEHICLE HEATING, VENTILATING, AND AIR CONDITIONING SYSTEMS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 17/363,629

(22) Filed: Jun. 30, 2021

(65) Prior Publication Data

US 2022/0001723 A1    Jan. 6, 2022

Related U.S. Application Data

(60) Provisional application No. 63/047,814, filed on Jul. 2, 2020.

(51) Int. Cl.
*B60H 1/32*          (2006.01)
*B60H 1/00*          (2006.01)
(Continued)

(52) U.S. Cl.
CPC ....... *B60H 1/3229* (2013.01); *B60H 1/00007* (2013.01); *B60H 1/00428* (2013.01);
(Continued)

(58) Field of Classification Search
CPC .............. B60H 1/3229; B60H 1/00007; B60H 1/00428; B60H 1/3222; B60H 2001/3294;
(Continued)

(56) References Cited

U.S. PATENT DOCUMENTS

D240,428  S     4/1881  Lane
2,521,393 A     9/1950  Messinger
(Continued)

FOREIGN PATENT DOCUMENTS

AE           5258      7/2016
AU     201613490 S     7/2016
(Continued)

OTHER PUBLICATIONS apucenter.com, Auxiliary Power Units—Service—Parts, Comfort Master, https://web.archive.org/web/20140111007l5/http://apucenter.com/, Jan. 11, 2014, 2 pages.

(Continued)

*Primary Examiner* — Ljiljana V. Ciric
(74) *Attorney, Agent, or Firm* — Schacht Law Office, Inc.; Michael R. Schacht

(57) ABSTRACT

A compressor system for a vehicle comprising a vehicle internal combustion engine and a vehicle heating and cooling system. The compressor system comprising a compressor/motor generator defining a compressor motor/generator shaft, a compressor mechanically connected to the compressor motor/generator shaft; and a engine clutch mechanically connected to the compressor motor/generator shaft and to the vehicle internal combustion engine.

4 Claims, 6 Drawing Sheets

(51) Int. Cl.
  *F04B 35/00* (2006.01)
  *F04B 35/04* (2006.01)
  *F04D 25/06* (2006.01)

(52) U.S. Cl.
  CPC ......... *B60H 1/3222* (2013.01); *F04B 35/002* (2013.01); *F04B 35/04* (2013.01); *F04D 25/06* (2013.01); *B60H 2001/3294* (2013.01); *Y02T 10/88* (2013.01)

(58) Field of Classification Search
  CPC ........ F04B 35/002; F04B 35/04; F04D 25/06; Y02T 10/88
  See application file for complete search history.

(56) References Cited

U.S. PATENT DOCUMENTS

| | | |
|---|---|---|
| 2,961,939 A | 11/1960 | Angelo |
| 3,065,381 A | 11/1962 | Kyle |
| 3,290,576 A | 12/1966 | Jensen et al. |
| 3,583,156 A | 6/1971 | Schabert |
| 3,606,982 A | 9/1971 | Anderson |
| 3,663,364 A | 5/1972 | Thompson et al. |
| 3,897,526 A | 7/1975 | Morse et al. |
| 3,906,906 A | 9/1975 | Arai |
| 4,055,299 A | 10/1977 | Norberg et al. |
| 4,217,764 A | 8/1980 | Armbruster |
| 4,280,330 A | 7/1981 | Harris et al. |
| 4,463,576 A | 8/1984 | Burnett et al. |
| 4,531,379 A | 7/1985 | Diefenthaler, Jr. |
| 4,602,485 A | 7/1986 | Fujimoto et al. |
| D287,264 S | 12/1986 | Rinaldo et al. |
| 4,630,775 A | 12/1986 | Mandon et al. |
| 4,648,356 A | 3/1987 | Hayashi |
| 4,825,663 A | 5/1989 | Nijjar et al. |
| 4,925,092 A | 5/1990 | Yoshida et al. |
| 4,947,657 A | 8/1990 | Kalmbach |
| D322,122 S | 12/1991 | Guetersloh et al. |
| D324,420 S | 3/1992 | Farce |
| D338,952 S | 8/1993 | Snow |
| 5,285,654 A | 2/1994 | Ferdows |
| 5,333,678 A | 8/1994 | Mellum et al. |
| 5,408,150 A | 4/1995 | Wilcox |
| 5,481,178 A | 1/1996 | Wilcox et al. |
| 5,701,755 A | 12/1997 | Severson et al. |
| 5,705,919 A | 1/1998 | Wilcox |
| D393,703 S | 4/1998 | Gilbertson |
| 5,808,441 A | 9/1998 | Nehring |
| 5,896,750 A | 4/1999 | Karl |
| 5,901,780 A | 5/1999 | Zeigler et al. |
| 5,929,620 A | 7/1999 | Dobkin et al. |
| 6,116,513 A | 9/2000 | Perhats |
| 6,144,194 A | 11/2000 | Varga |
| 6,158,230 A | 12/2000 | Katsuki |
| 6,177,787 B1 | 1/2001 | Hobrecht |
| D453,560 S | 2/2002 | Van Brunt |
| 6,367,272 B1 | 4/2002 | Zeng et al. |
| D456,887 S | 5/2002 | Zlotnik |
| 6,427,465 B1 | 8/2002 | Bednarchik et al. |
| 6,460,356 B1 | 10/2002 | Tao et al. |
| 6,546,744 B1 | 4/2003 | Cavender |
| 6,615,602 B2 | 9/2003 | Wilkinson |
| 6,651,759 B1 | 11/2003 | Gruenwald et al. |
| 6,801,842 B2 | 10/2004 | Egami et al. |
| 6,863,139 B2 | 3/2005 | Egami et al. |
| 7,047,743 B1 | 5/2006 | Stahlhut et al. |
| D532,893 S | 11/2006 | Wu |
| D536,078 S | 1/2007 | Leon |
| D536,079 S | 1/2007 | Leon |
| 7,181,918 B2 | 2/2007 | Reinders |
| D548,750 S | 8/2007 | Neeley et al. |
| 7,305,842 B1 | 12/2007 | Schiff |
| D575,381 S | 8/2008 | Leon |
| 7,430,874 B2 | 10/2008 | Prince et al. |
| 7,448,227 B2 | 11/2008 | Zeigler et al. |
| 7,579,801 B2 | 8/2009 | Mazaika |
| 7,762,062 B2 | 7/2010 | Opris |
| D630,310 S | 1/2011 | Beland et al. |
| D631,145 S | 1/2011 | Beland et al. |
| D644,320 S | 8/2011 | Virr et al. |
| D647,192 S | 10/2011 | Esteve et al. |
| D648,018 S | 11/2011 | Sordo |
| D663,816 S | 7/2012 | Tebe Poves et al. |
| 8,468,843 B2 | 6/2013 | Futernik et al. |
| 8,579,748 B2 | 11/2013 | Kawasaki et al. |
| D698,431 S | 1/2014 | Garbusi et al. |
| 8,927,905 B1 | 1/2015 | Sunday |
| D723,674 S | 3/2015 | Zaari |
| 8,967,116 B2 | 3/2015 | Leone et al. |
| 9,049,971 B2 | 6/2015 | Andrews |
| 9,050,897 B1 | 6/2015 | Collins |
| 9,102,225 B2 | 8/2015 | Major et al. |
| 9,291,191 B1 | 3/2016 | Rejkowski et al. |
| D755,943 S | 5/2016 | Lanssky |
| 9,374,003 B1 | 6/2016 | McJimsey et al. |
| 9,375,121 B2 | 6/2016 | Coesel |
| D762,830 S | 8/2016 | Lewis |
| D763,423 S | 8/2016 | Hewett et al. |
| D766,414 S | 9/2016 | Chu |
| D778,415 S | 2/2017 | Ogg |
| 9,669,936 B1 | 6/2017 | Fiterman et al. |
| 9,701,175 B2 | 7/2017 | Miller et al. |
| D801,500 S | 10/2017 | Andrews |
| D801,501 S | 10/2017 | Andrews |
| 9,925,847 B2 | 3/2018 | Andrews et al. |
| 10,309,703 B2 | 6/2019 | Andrews |
| 10,384,785 B2 | 8/2019 | Bruno et al. |
| 10,391,837 B2 | 8/2019 | Andrews et al. |
| 10,407,048 B1 * | 9/2019 | Sheldon ................ B60H 1/004 |
| 10,543,925 B2 | 1/2020 | Bammann et al. |
| 10,843,804 B2 | 11/2020 | Lo |
| 10,926,884 B2 | 2/2021 | Bruno et al. |
| 11,135,892 B2 | 10/2021 | Andrews |
| 11,136,050 B2 | 10/2021 | Frankenberger et al. |
| 11,286,821 B2 | 3/2022 | Andrews |
| 11,407,283 B2 | 8/2022 | Andrews |
| 2002/0070557 A1 | 6/2002 | Geis |
| 2002/0112490 A1 | 8/2002 | Gong |
| 2002/0145209 A1 | 10/2002 | Litz |
| 2002/0157414 A1 | 10/2002 | Iwanami et al. |
| 2002/0189265 A1 | 12/2002 | Ferris et al. |
| 2003/0098148 A1 | 5/2003 | Mehraban et al. |
| 2003/0192952 A1 | 10/2003 | Horn et al. |
| 2003/0217559 A1 | 11/2003 | Ieda et al. |
| 2004/0025525 A1 | 2/2004 | Kubo et al. |
| 2004/0104578 A1 | 6/2004 | Wurtele |
| 2004/0168455 A1 | 9/2004 | Nakamura |
| 2005/0035657 A1 | 2/2005 | Brummett et al. |
| 2005/0044864 A1 | 3/2005 | Manole et al. |
| 2005/0053495 A1 | 3/2005 | Lebecq et al. |
| 2005/0166629 A1 | 8/2005 | Axe et al. |
| 2005/0193754 A1 | 9/2005 | Chang et al. |
| 2005/0217288 A1 | 10/2005 | Uno et al. |
| 2005/0241818 A1 | 11/2005 | Yakumaru et al. |
| 2005/0257545 A1 | 11/2005 | Ziehr et al. |
| 2006/0028871 A1 | 2/2006 | Suzuki |
| 2006/0042286 A1 | 3/2006 | Heberle et al. |
| 2006/0130469 A1 | 6/2006 | Baeuerle et al. |
| 2006/0156761 A1 | 7/2006 | Mola et al. |
| 2006/0288713 A1 | 12/2006 | Knight et al. |
| 2007/0075695 A1 | 4/2007 | Gan et al. |
| 2007/0193291 A1 | 8/2007 | Reddin et al. |
| 2007/0204639 A1 | 9/2007 | Harrison |
| 2007/0289325 A1 | 12/2007 | Stone |
| 2009/0014150 A1 | 1/2009 | Masters et al. |
| 2009/0136387 A1 | 5/2009 | Picton et al. |
| 2009/0211280 A1 | 8/2009 | Alston |
| 2009/0228150 A1 | 9/2009 | Alston |
| 2009/0293522 A1 | 12/2009 | Miyazaki |
| 2010/0089563 A1 | 4/2010 | Sundhar et al. |
| 2010/0146968 A1 | 6/2010 | Simpson et al. |
| 2010/0181138 A1 | 7/2010 | Khadiya et al. |
| 2010/0192548 A1 | 8/2010 | Irlbeck et al. |
| 2011/0067422 A1 | 3/2011 | Ichishi et al. |

(56) References Cited

U.S. PATENT DOCUMENTS

| | | |
|---|---|---|
| 2011/0114405 A1 | 5/2011 | Perhats |
| 2011/0209490 A1 | 9/2011 | Mijanovic et al. |
| 2011/0296833 A1 | 12/2011 | Jozsa et al. |
| 2011/0302942 A1 | 12/2011 | Birchard |
| 2012/0031581 A1 | 2/2012 | Chillar et al. |
| 2013/0000342 A1* | 1/2013 | Blasko ............... B60H 1/3223 62/235.1 |
| 2013/0056992 A1 | 3/2013 | Wada et al. |
| 2013/0118196 A1 | 5/2013 | Chen et al. |
| 2013/0199217 A1 | 8/2013 | Arai et al. |
| 2013/0227973 A1 | 9/2013 | Kang et al. |
| 2013/0263574 A1 | 10/2013 | Levin et al. |
| 2013/0270249 A1 | 10/2013 | Suzuki et al. |
| 2013/0284524 A1 | 10/2013 | Collins |
| 2013/0319359 A1 | 12/2013 | Evans |
| 2014/0007574 A1 | 1/2014 | Pegg et al. |
| 2014/0007605 A1 | 1/2014 | Schneider et al. |
| 2014/0230470 A1 | 8/2014 | Cook |
| 2014/0244107 A1 | 8/2014 | Delevski et al. |
| 2014/0259517 A1 | 9/2014 | Andrews |
| 2014/0260369 A1 | 9/2014 | LePoudre |
| 2014/0270240 A1 | 9/2014 | Solomon et al. |
| 2014/0270242 A1 | 9/2014 | Cheung et al. |
| 2014/0345104 A1 | 11/2014 | Andrews et al. |
| 2015/0000636 A1 | 1/2015 | Stockbridge et al. |
| 2015/0013357 A1 | 1/2015 | Stockbridge et al. |
| 2015/0047144 A1 | 2/2015 | Coesel |
| 2015/0077737 A1 | 3/2015 | Belinsky et al. |
| 2015/0096313 A1 | 4/2015 | Ragazzi |
| 2015/0209918 A1 | 7/2015 | Andrews |
| 2015/0210141 A1 | 7/2015 | Ragazzi |
| 2015/0224635 A1 | 8/2015 | Andrews |
| 2015/0251520 A1 | 9/2015 | Andrews et al. |
| 2015/0289734 A1 | 10/2015 | Andrews |
| 2015/0314669 A1 | 11/2015 | Noda |
| 2016/0089958 A1 | 3/2016 | Powell |
| 2016/0111959 A1 | 4/2016 | Erickson, Jr. et al. |
| 2016/0121899 A1 | 5/2016 | Wankhede |
| 2016/0197534 A1 | 7/2016 | Walker et al. |
| 2016/0238292 A1 | 8/2016 | Andrews |
| 2016/0265819 A1 | 9/2016 | Durrani et al. |
| 2016/0288619 A1 | 10/2016 | Andrews |
| 2016/0327289 A1 | 11/2016 | Mothfar |
| 2016/0368373 A1 | 12/2016 | Dudar et al. |
| 2017/0015175 A1 | 1/2017 | Pursifull |
| 2017/0015176 A1 | 1/2017 | Ulrey et al. |
| 2017/0043647 A1 | 2/2017 | Vergamini |
| 2017/0070065 A1 | 3/2017 | Weflen |
| 2017/0129614 A1 | 5/2017 | Bammann et al. |
| 2017/0158026 A1 | 6/2017 | Menard et al. |
| 2017/0197492 A1 | 7/2017 | Ishizeki et al. |
| 2017/0197678 A1 | 7/2017 | Scaringe |
| 2017/0217286 A1 | 8/2017 | Tsukamoto et al. |
| 2017/0229965 A1 | 8/2017 | Parto |
| 2017/0305236 A1 | 10/2017 | Berkson et al. |
| 2017/0341759 A1 | 11/2017 | Bruno et al. |
| 2018/0058287 A1 | 3/2018 | Zhang |
| 2018/0162377 A1 | 6/2018 | Colavincenzo et al. |
| 2018/0215235 A1 | 8/2018 | Andrews et al. |
| 2018/0215475 A1 | 8/2018 | Hurt et al. |
| 2018/0237144 A1 | 8/2018 | Bruno et al. |
| 2018/0266742 A1 | 9/2018 | Andrews |
| 2019/0077216 A1 | 3/2019 | Andrews |
| 2019/0162121 A1 | 5/2019 | Staubach et al. |
| 2019/0193524 A1 | 6/2019 | Stoltz |
| 2019/0255912 A1 | 8/2019 | Ulrey et al. |
| 2019/0255913 A1 | 8/2019 | Ulrey et al. |
| 2019/0256077 A1 | 8/2019 | Stoltz |
| 2019/0283897 A1 | 9/2019 | Orlando et al. |
| 2019/0329629 A1 | 10/2019 | Andrews |
| 2019/0337627 A1 | 11/2019 | Bruno et al. |
| 2020/0207184 A1 | 7/2020 | Schumacher et al. |
| 2020/0235666 A1 | 7/2020 | Ke et al. |
| 2021/0159792 A1 | 5/2021 | Andrews et al. |
| 2021/0170873 A1 | 6/2021 | Andrews |
| 2021/0387502 A1 | 12/2021 | Andrews |
| 2022/0048355 A1 | 2/2022 | Andrews |
| 2022/0136730 A1 | 5/2022 | Schoch et al. |
| 2022/0281286 A1 | 9/2022 | Andrews |
| 2022/0281288 A1 | 9/2022 | Andrews |
| 2023/0163688 A1 | 5/2023 | Andrews et al. |
| 2024/0030818 A1 | 1/2024 | Andrews et al. |

FOREIGN PATENT DOCUMENTS

| | | | |
|---|---|---|---|
| AU | 2017212417 A1 | 5/2018 | |
| AU | 2015229661 B2 | 5/2019 | |
| AU | 2016243053 A1 | 5/2021 | |
| AU | 2016243053 B2 | 5/2021 | |
| AU | 2017261902 A1 | 4/2022 | |
| AU | 2017261902 B2 | 4/2022 | |
| CA | 2939298 A1 | 9/2015 | |
| CA | 2978335 A1 | 10/2016 | |
| CA | 3004780 A1 | 8/2017 | |
| CA | 3015917 A1 | 11/2017 | |
| CA | 2939298 C | 4/2019 | |
| CA | 3041378 A1 | 10/2019 | |
| CA | 3102595 A1 | 12/2019 | |
| CA | 3103426 A1 | 12/2019 | |
| CN | 202926544 U | 5/2013 | |
| CN | 103303098 A | 9/2013 | |
| CN | 103363603 A | 10/2013 | |
| CN | 203623404 U | 6/2014 | |
| CN | 104713260 A | 6/2015 | |
| CN | 104919259 A | 9/2015 | |
| CN | ZL2016302998987 | 7/2016 | |
| CN | 106414122 A | 2/2017 | |
| CN | 109383222 A | 2/2019 | |
| DE | 102009048719 A1 | 4/2011 | |
| DE | 102019105576 A1 * | 9/2019 | ......... B60H 1/00271 |
| EP | 1219478 B1 | 3/2006 | |
| EP | 2100494 A2 | 9/2009 | |
| EP | 0032556780001 | 6/2016 | |
| EP | 3277529 A1 | 2/2018 | |
| EP | 2897270 B1 | 7/2018 | |
| EP | 3277529 A4 | 12/2018 | |
| EP | 3408117 A4 | 9/2019 | |
| EP | 3455095 B1 | 11/2021 | |
| EP | 4066368 A1 | 10/2022 | |
| EP | 3277529 B1 | 10/2023 | |
| FR | 2995014 B1 | 9/2014 | |
| FR | 3040563 B1 | 11/2019 | |
| JP | 2621547 B | 6/1997 | |
| JP | H11301255 A | 11/1999 | |
| JP | 2005212735 A | 8/2005 | |
| JP | 2006298283 A | 11/2006 | |
| JP | 2008081078 A | 4/2008 | |
| JP | 2009184621 A | 8/2009 | |
| JP | 2013217340 A | 10/2013 | |
| JP | 2018077003 A | 5/2018 | |
| JP | 2020015414 A | 1/2020 | |
| JP | 2020026197 A | 2/2020 | |
| JP | 2020185969 A | 11/2020 | |
| KR | 20080010646 A | 1/2008 | |
| KR | 20210025927 A | 3/2021 | |
| KR | 20210069463 A | 6/2021 | |
| RU | 2146034 C1 | 2/2000 | |
| RU | 2157037 C1 | 9/2000 | |
| RU | 2425436 C2 | 7/2011 | |
| RU | 2516912 C1 | 5/2014 | |
| RU | 2571895 C1 | 12/2015 | |
| SA | 5473 | 7/2016 | |
| SA | 516371813 | 9/2016 | |
| SA | 518392046 B1 | 6/2023 | |
| SU | 634976 A1 | 11/1978 | |
| SU | 1558311 A3 | 4/1990 | |
| WO | 2007111905 A2 | 10/2007 | |
| WO | WO-2011094099 A1 * | 8/2011 | ......... B60H 1/00428 |
| WO | 2013142992 A1 | 10/2013 | |
| WO | 2014149567 A1 | 9/2014 | |
| WO | 2015065643 A1 | 5/2015 | |
| WO | 2015097457 A1 | 7/2015 | |
| WO | 2015138352 A1 | 9/2015 | |
| WO | 2016006278 A1 | 1/2016 | |

(56) References Cited

FOREIGN PATENT DOCUMENTS

| | | |
|---|---|---|
| WO | 2016161447 A1 | 10/2016 |
| WO | 2017132260 A1 | 8/2017 |
| WO | 2017197407 A1 | 11/2017 |
| WO | 2018009406 A1 | 1/2018 |
| WO | 2019075269 A1 | 4/2019 |
| WO | 2019236617 A1 | 12/2019 |
| WO | 2020097124 A1 | 5/2020 |

OTHER PUBLICATIONS

Bergstrom, Bergstrom NITE No-Idle, https://web.archive.org/web/20140207093405/http:/us.bergstrominc.com/nite-no-idle/, Feb. 7, 2014, 1 page.

CIPO, "Notification of the First Office Action", Application No. 201580012907.2, dated Apr. 27, 2018, 8 pages.

ClimaCab Crosspoint Solutions, ClimaCab 3.0 APU, Product Overview and Brochure, http://www.crosspointsolutionsgroup.com/climacab/product/climacab-apu.html, 2012, 6 pages.

Cool-It, 12V No-Idle Split A/C System, Product Overview and Brochure, http://cool-it.ca/?s=12+volt+no+idle+system, 2012, 8 pages.

DC Airco, High Efficiency Direct Current Air Conditioners, https://web.archive.org/web/20130825041413/http://dcairco.com/index.php/products/trucks, Aug. 25, 2013, 3 pages.

Dometic Group, Dometic Showcases Expanded Line of HVAC Systems for Day Cabs, http://www.2.dometic.com/enus/Americas/USA/Truck-News/Dometic-Showcases-Expanded-Line-of-HVAC-Systems-For-Day-Cabs/, 2010, 1 page.

Hammond Air Conditioning Ltd., Arctic Breeze Truck AC: 12V/DC air conditioning keeps cabs cool without wasting fuel, https://web.archive.org/web/20140108111758/http://www.arcticbreeze-truckac.com/, Jan. 8, 2014, 1 page.

Idle Free Systems, Inc., Systems for all driving conditions, budgets, and investment timelines, http://idlefreesystems.com/no-idle-elimination-systems-battery-reffer-busses.html, 2010-2011, 1 page.

Indel B, Sleeping Well, https://web.archive.org/web/20130530064452/http://www.indelb.com/products/truck_air_conditioning/sleeping_well, May 30, 2013, 2 pages.

International Search Authority, ISR, PCT/US2021039834, dated Oct. 14, 2021, 2 pages.

International Searching Authority, ISR & Written Opinion, PCT/US/2020062395, dated Feb. 25, 2021, 44 pages.

International Searching Authority, ISR & Written Opinion, PCT/US2015019523, dated Jun. 10, 2015, 7 pages.

International Searching Authority, ISR & Written Opinion, PCT/US2016/025923, dated Sep. 8, 2016, 7 pages.

International Searching Authority, ISR & Written Opinion, PCT/US2017/032750, dated Aug. 24, 2017, 7 pages.

International Searching Authority, ISR & Written Opinion, PCT/US2018/055510, dated Dec. 27, 2018, 9 pages.

International Searching Authority, ISR & Written Opinion, PCT/US2019/035444, dated Aug. 29, 2019, 8 pages.

International Searching Authority, Written Opinion & ISR, PCT/US2017/014941, dated Apr. 20, 2017, 7 pages.

Rigmaster Power, The Ultimate Stand-Alone Truck Mounted APU, http://rigmasterpower.com, 2011, 1 page.

Smith, Sam, "Jaguar Builds A Twin-Turbine Electric Supercar You Can't Have", Gear, https://www.wired.com/2010/09/paris-auto-show-jaguar-cx75/#:~:text=At%20this%20year's%20Paris%20auto,ever%20be%20able%20to%20buy, Sep. 30, 2010, 1 page.

Thermo King, APU Tripac Evolution, Product Overview and Brochure, http://www.na.thermoking.com/tk-innovation/global/en/products/apu.html, 2011, 9 pages.

US Department of Energy, Combined Heat and Power Technology Fact Sheet Series, "Absorption Chillers for CHP Systems", DOE/EE-1608, May 2017, 4 pages.

USPTO, "Final Office Action, U.S. Appl. No. 15/047,442", dated Feb. 14, 2018, 15 pages.

USPTO, "Final Office Action, U.S. Appl. No. 15/090,455", dated Aug. 30, 2018, 18 pages.

USPTO, "Final Office Action, U.S. Appl. No. 15/090,455", dated Dec. 22, 2021, 44 pages.

USPTO, "Non-Final Office Action, U.S. Appl. No. 15/047,442", dated Aug. 10, 2017, 6 pages.

USPTO, "Non-Final Office Action, U.S. Appl. No. 14/642,601", dated Jun. 16, 2017, 9 pages.

USPTO, "Non-Final Office Action, U.S. Appl. No. 15/090,455," dated Jan. 18, 2018, 29 pages.

USPTO, "Non-Final Office Action, U.S. Appl. No. 15/090,455," dated Mar. 19, 2019, 17 pages.

USPTO, "Non-Final Office Action, U.S. Appl. No. 15/936,747," dated Sep. 13, 2018, 13 pages.

Linear Technology LTC3787, PolyPhase Synchronous Boost Controller, https://www.analog.com/media/en/technical-documentation/data-sheets/3787fc.pdf; Year 2019, 36 pages.

Texas Instruments, AN-2205 LM25118 Evaluation Board—User's Guide, Jan. 2012—Revised Jan. 2014, pp. 1-16, Dallas, Texas.

Texas Instruments, TPS61252 Evaluation Module—User's Guide, Oct. 2010, pp. 1-10, Dallas Texas.

\* cited by examiner

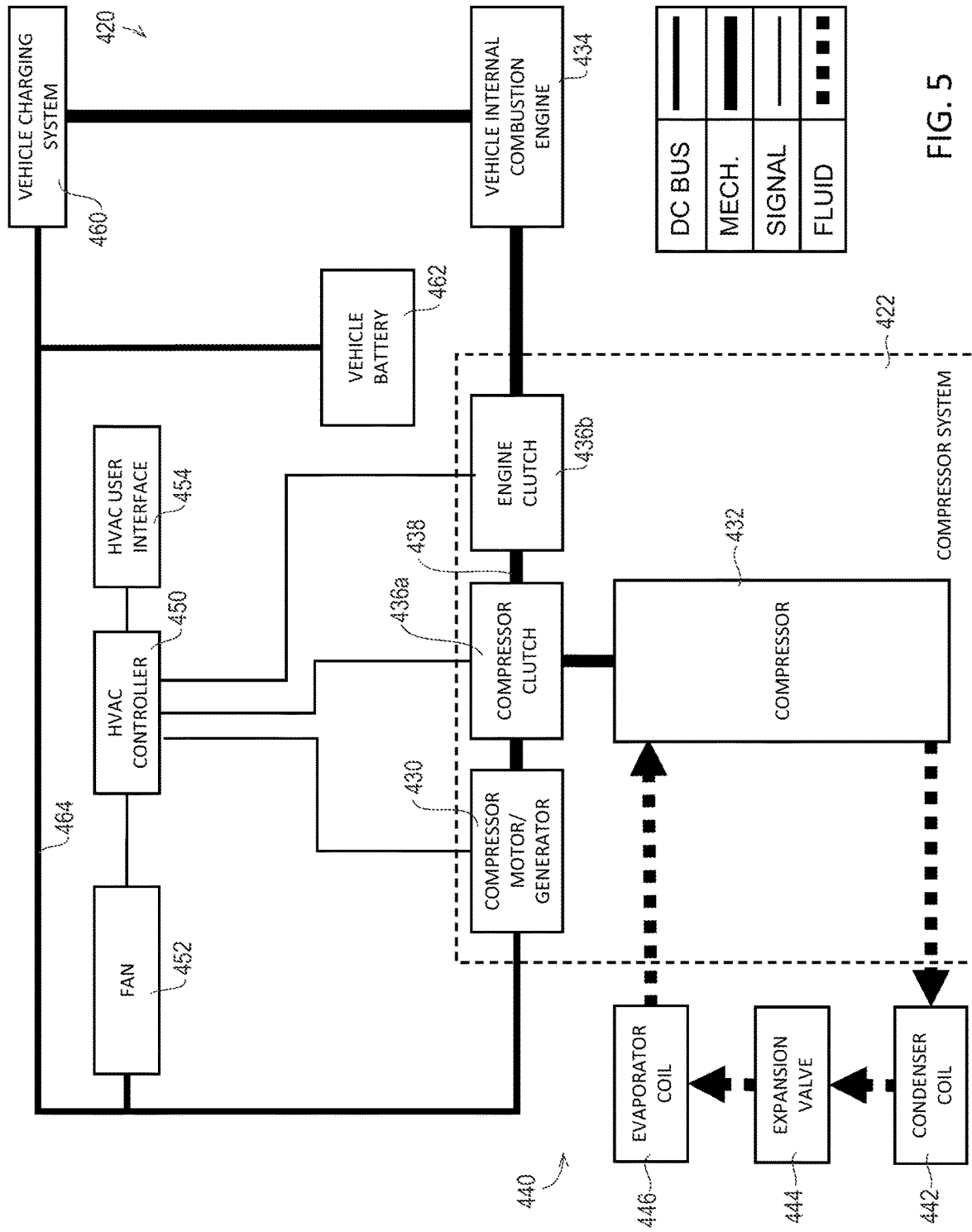

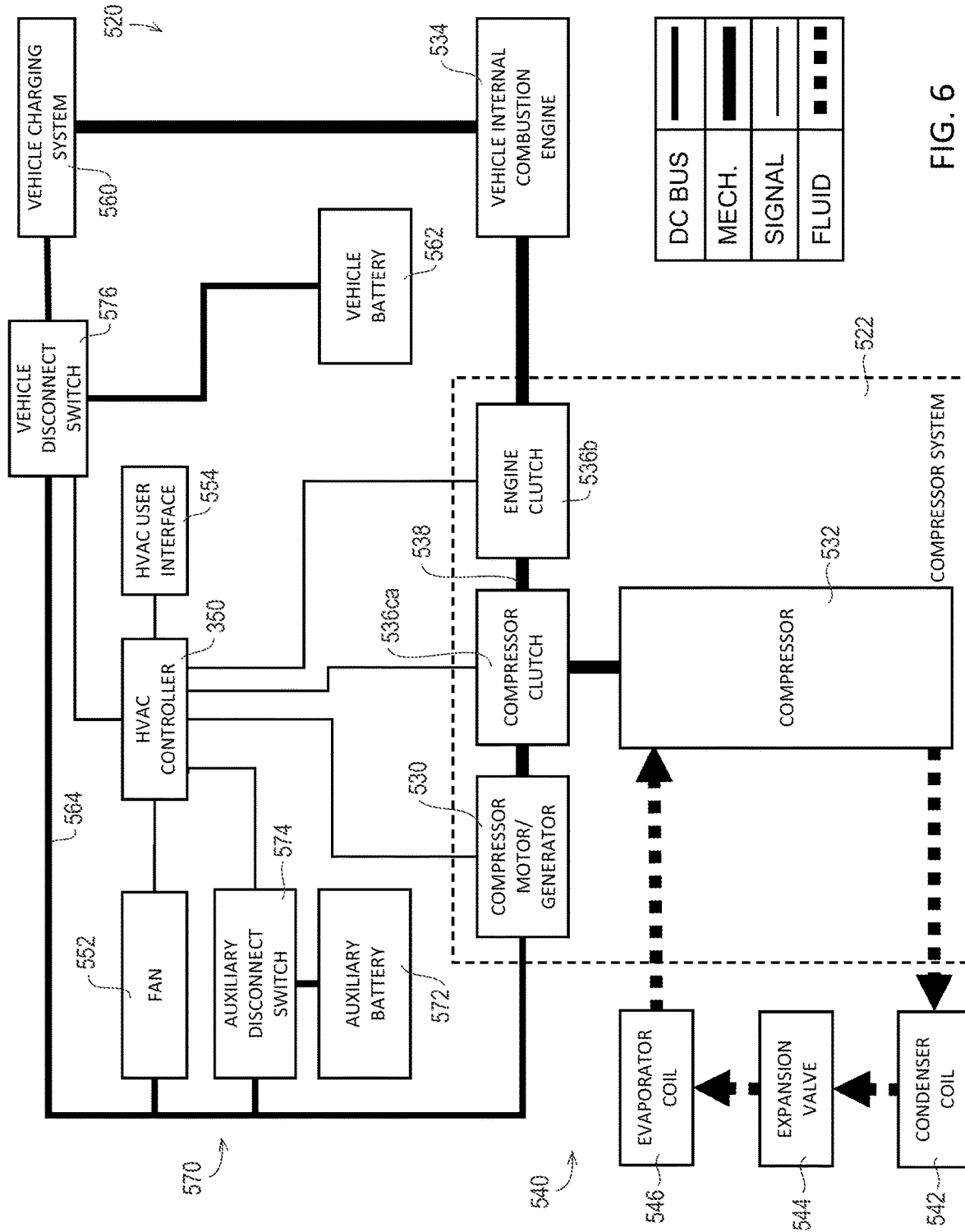

COMPRESSOR SYSTEMS AND METHODS FOR USE BY VEHICLE HEATING, VENTILATING, AND AIR CONDITIONING SYSTEMS

RELATED APPLICATIONS

This application, U.S. patent application Ser. No. 17/363,629 filed Jun. 30, 2021, claims benefit of U.S. Provisional Application Ser. No. 63/047,814 filed Jul. 2, 2020, the contents of which are incorporated herein by reference.

TECHNICAL FIELD

The present invention relates to compressor systems and methods and, in particular, to compressor systems and methods for vehicle heating, ventilating, and air conditioning systems.

BRIEF DESCRIPTION OF THE DRAWINGS

FIG. 5 is a schematic block diagram illustrating a fifth example vehicle heating, ventilating, and air conditioning system comprising a fifth example compressor system of the present invention; and FIG. 6 is a schematic block diagram illustrating a sixth example vehicle heating, ventilating, and air conditioning system comprising a sixth example compressor system of the present invention.

DETAILED DESCRIPTION

The present invention may take a number of different forms, and several examples of the present of the present invention will be discussed separately below.

I. First Example

Figure 1:
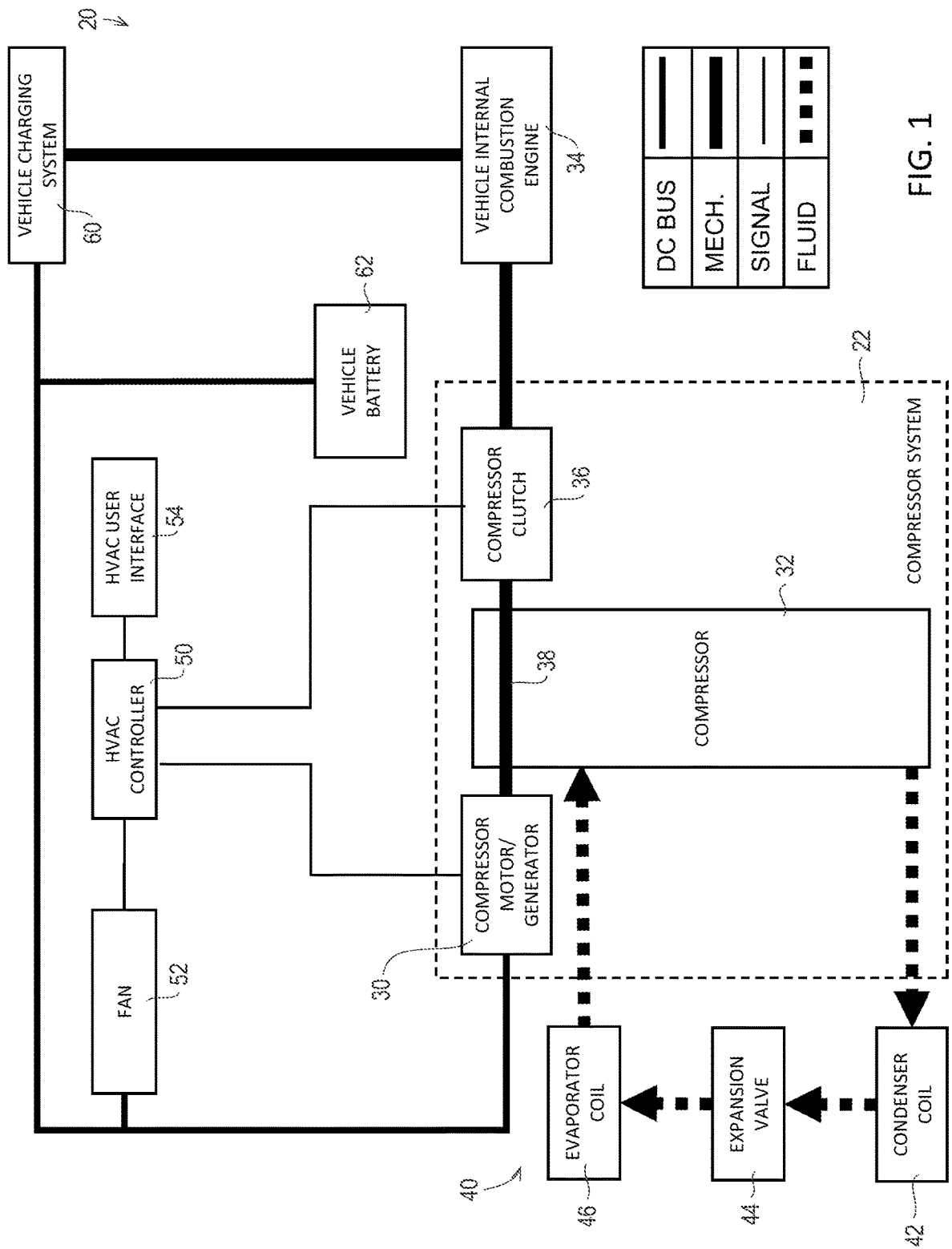
FIG. 1 is a schematic block diagram illustrating a first example vehicle heating, ventilating, and air conditioning system comprising a first example compressor system of the present invention.

Referring initially to FIG. 1 of the drawing, depicted therein is a first example vehicle heating, ventilating, and air conditioning system 20 comprising a first example compressor system 22. The first example compressor system 22 comprises a compressor motor/generator 30 mechanically connected to a compressor 32 and a vehicle internal combustion engine 34 through an engine clutch 36. The compressor system 22 that can be operated in a first mode in which the compressor motor/generator 30 mechanically engages and operates the compressor 32 and in a second mode in which the compressor motor/generator 30 generates electricity based on operation of the vehicle internal combustion engine 34. The engine clutch 36 mechanically disengages a compressor motor/generator shaft 38 from the vehicle combustion engine 34 in the first mode and mechanically engages the compressor motor/generator shaft 38 with the vehicle combustion engine 34 in the second mode.

The first example compressor system 22 forms a part of a heat pump system 40 further comprising a condenser coil 42, an expansion valve 44, and an evaporator coil 46. In addition to the first example compressor system 22, the first example vehicle heating, ventilating, and air conditioning system 20 further comprises an HVAC controller 50, a fan 52, and a HVAC user interface 54. The vehicle internal combustion engine 34 is mechanically connected to a vehicle charging system 60, and the vehicle charging system 60 supplies power to a vehicle battery 62 through a DC bus 64. Power to the compressor motor/generator 30 and the fan 52 may also be supplied from the vehicle charging system 30 through the DC bus 64. Electrical power generated by the compressor/motor generator 30 in the second mode may be supplied to the DC bus 64.

II. Second Example

Figure 2:
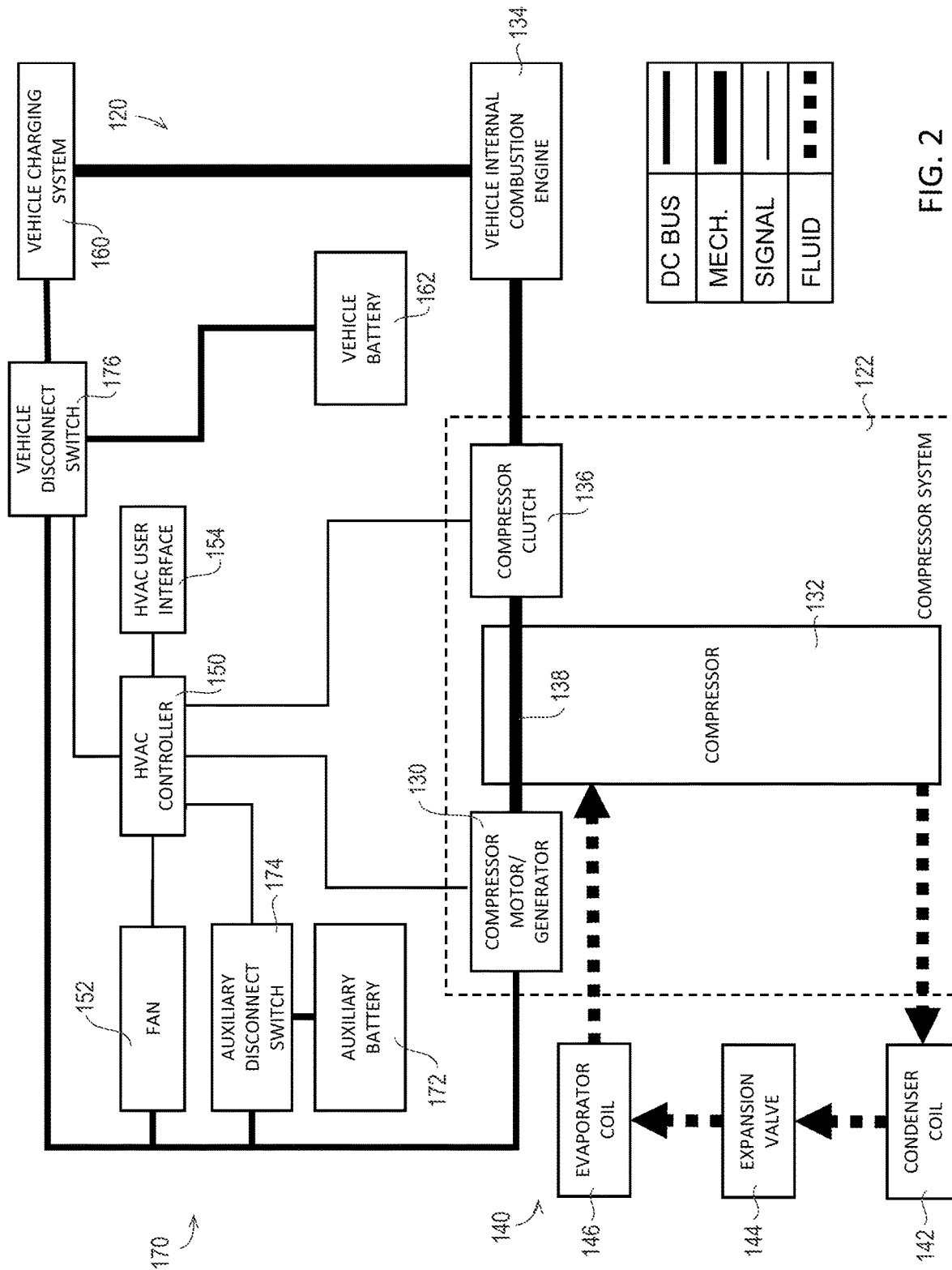
FIG. 2 is a schematic block diagram illustrating a second example vehicle heating, ventilating, and air conditioning system comprising a second example compressor system of the present invention.

Referring now to FIG. 2 of the drawing, depicted therein is a second example vehicle heating, ventilating, and air conditioning system 120 comprising a second example compressor system 122. The second example compressor system 122 comprises a compressor motor/generator 130 mechanically connected to a compressor 132 and a vehicle internal combustion engine 134 through an engine clutch 136. The second example compressor system 122 can be operated in a first mode in which the compressor motor/generator 130 mechanically engages and operates the compressor 132 and in a second mode in which the compressor motor/generator 130 generates electricity based on operation of the vehicle internal combustion engine 134. The engine clutch 136 mechanically disengages a compressor motor/generator shaft 138 from the vehicle combustion engine 134 in the first mode and mechanically engages the compressor motor/generator shaft 138 with the vehicle combustion engine 134 in the second mode.

The second example compressor system 122 forms a part of a heat pump system 140 further comprising a condenser coil 142, an expansion valve 144, and an evaporator coil 146. In addition to the second example compressor system 122, the second example vehicle heating, ventilating, and air conditioning system 120 further comprises an HVAC controller 150, a fan 152, and a HVAC user interface 154. The vehicle internal combustion engine 134 is mechanically connected to a vehicle charging system 160, and the vehicle charging system 160 supplies power to a vehicle battery 162 through a DC bus 164. Power to the compressor motor/generator 130 and the fan 152 may also be supplied from the vehicle charging system 130 through the DC bus 164. Electrical power generated by the compressor/motor generator 130 in the second mode may be supplied to the DC bus 164.

The second example vehicle heating, ventilating, and air conditioning system 120 further comprises an auxiliary power supply system 170 comprising an auxiliary battery 172, an auxiliary disconnect switch 174, and a vehicle disconnect switch 176. The second example vehicle heating, ventilating, and air conditioning system 120 may be operated based on electrical power generated by any one or any combination of the vehicle charging system 160, the vehicle battery 162, and the auxiliary battery 164 when the vehicle internal combustion engine 134 is not operating.

III. Third Example

Figure 3:
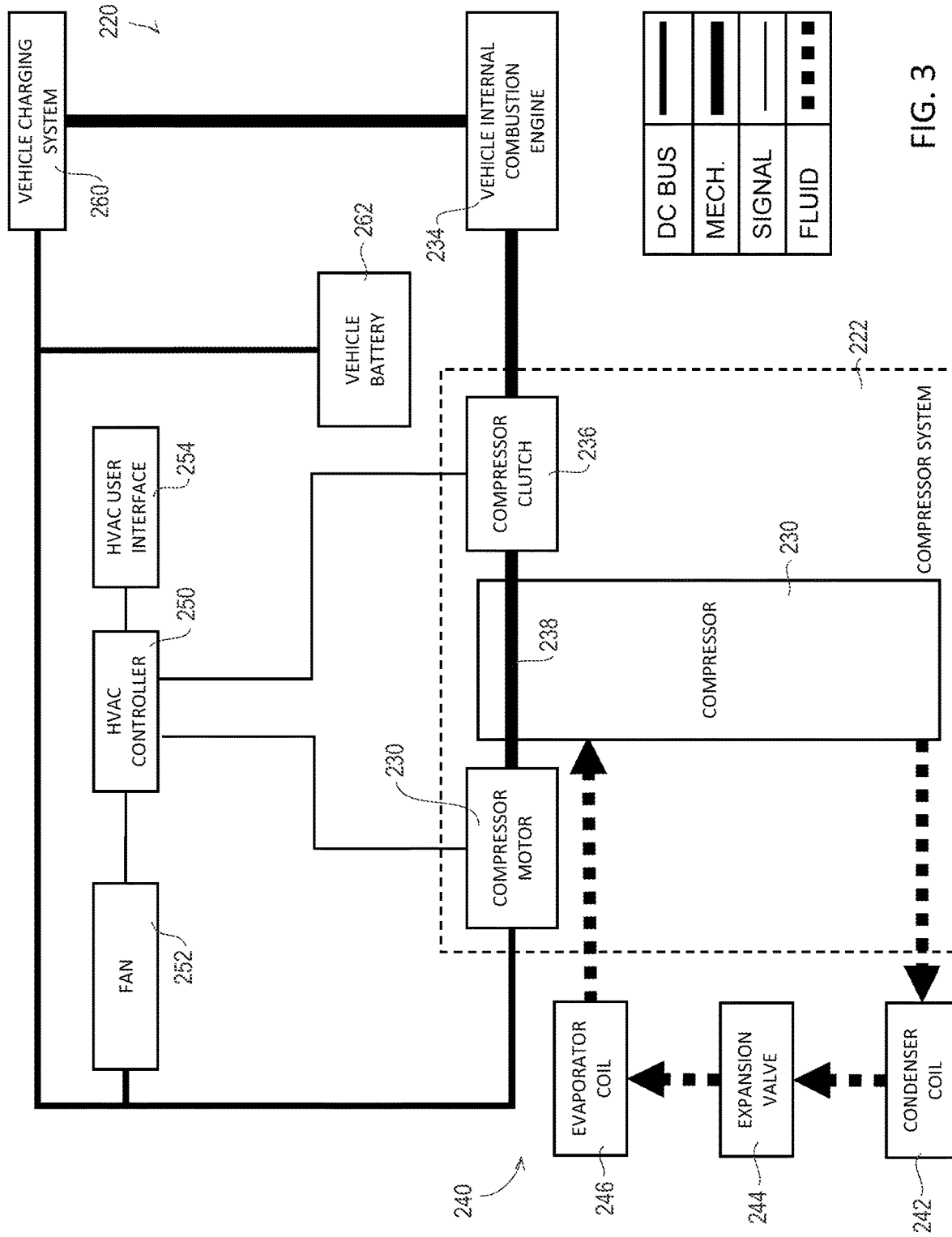
FIG. 3 is a schematic block diagram illustrating a third example vehicle heating, ventilating, and air conditioning system comprising a third example compressor system of the present invention.

Referring next to FIG. 3 of the drawing, depicted therein is a third example vehicle heating, ventilating, and air conditioning system 220 comprising a third example compressor system 222. The third example compressor system 222 comprises a compressor motor 230 mechanically connected to a compressor 232 and a vehicle internal combustion engine 234 through an engine clutch 236. The compressor system 222 that can be operated in a first mode in which the compressor motor 230 mechanically engages and operates the compressor 232 and in a second mode in which the vehicle internal combustion engine 234 ally engages and operates the compressor 232 through the engine clutch 236. The engine clutch 236 mechanically disengages a compressor motor/generator shaft 238 from the vehicle combustion engine 234 in the first mode and mechanically engages the compressor motor/generator shaft 238 with the vehicle combustion engine 234 in the second mode.

The third example compressor system 222 forms a part of a heat pump system 240 further comprising a condenser coil 242, an expansion valve 244, and an evaporator coil 246. In addition to the third example compressor system 222, the third example vehicle heating, ventilating, and air conditioning system 220 further comprises an HVAC controller 250, a fan 252, and a HVAC user interface 254. The vehicle internal combustion engine 234 is mechanically connected to a vehicle charging system 260, and the vehicle charging system 260 supplies power to a vehicle battery 262 through a DC bus 264. Power to the compressor motor 230 and the fan 252 may also be supplied from the vehicle charging system 230 through the DC bus 264. Electrical power generated by the compressor/motor generator 230 in the second mode may be supplied to the DC bus 264.

IV. Fourth Example

Figure 4:
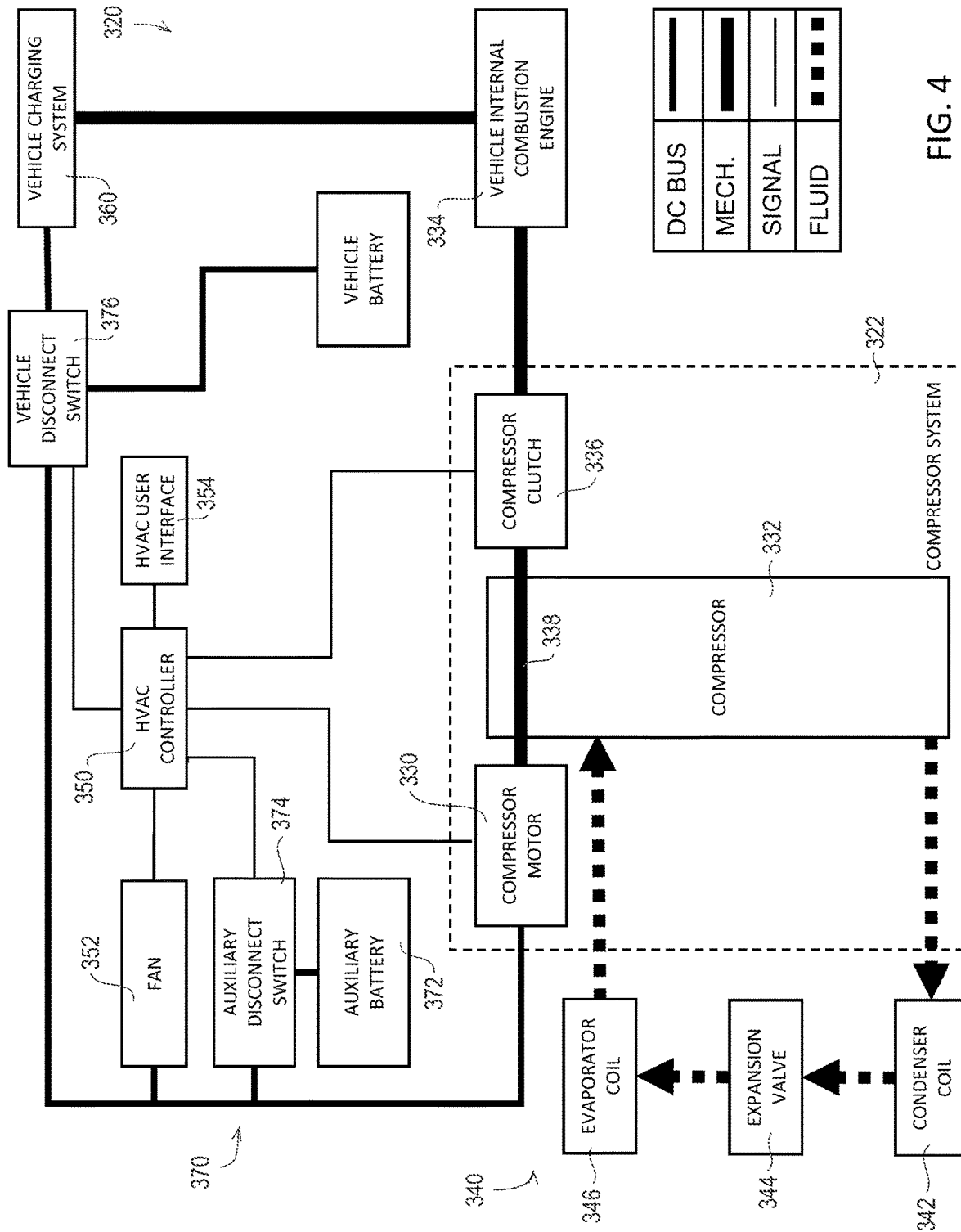
FIG. 4 is a schematic block diagram illustrating a fourth example vehicle heating, ventilating, and air conditioning system comprising a fourth example compressor system of the present invention.

Referring now to FIG. 4 of the drawing, depicted therein is a fourth example vehicle heating, ventilating, and air conditioning system 320 comprising a fourth example compressor system 322. The fourth example compressor system 322 comprises a compressor motor 330 mechanically connected to a compressor 332 and a vehicle internal combustion engine 334 through an engine clutch 336. The fourth example compressor system 322 can be operated in a first mode in which the compressor motor 330 mechanically engages and operates the compressor 332 and in a second mode in which the vehicle internal combustion engine 334 mechanically engages and operates the compressor 332 through the engine clutch 336. The engine clutch 336 mechanically disengages a compressor motor shaft 338 from the vehicle combustion engine 334 in the first mode and mechanically engages the compressor motor shaft 338 with the vehicle combustion engine 334 in the second mode.

The fourth example compressor system 322 forms a part of a heat pump system 340 further comprising a condenser coil 342, an expansion valve 344, and an evaporator coil 346. In addition to the fourth example compressor system 322, the fourth example vehicle heating, ventilating, and air conditioning system 320 further comprises an HVAC controller 350, a fan 352, and a HVAC user interface 354. The vehicle internal combustion engine 334 is mechanically connected to a vehicle charging system 360, and the vehicle charging system 360 supplies power to a vehicle battery 362 through a DC bus 364. Power to the compressor motor 330 and the fan 352 may also be supplied from the vehicle charging system 330 through the DC bus 364. Electrical power generated by the compressor/motor generator 330 in the second mode may be supplied to the DC bus 364.

The fourth example vehicle heating, ventilating, and air conditioning system 320 further comprises an auxiliary power supply system 370 comprising an auxiliary battery 372, an auxiliary disconnect switch 374, and a vehicle disconnect switch 376. The fourth example vehicle heating, ventilating, and air conditioning system 320 may be operated based on electrical power generated by any one or any combination of the vehicle charging system 360, the vehicle battery 362, and the auxiliary battery 364 when the vehicle internal combustion engine 334 is not operating.

V. Fifth Example

Referring now to FIG. 5 of the drawing, depicted therein is a fifth example vehicle heating, ventilating, and air conditioning system 420 comprising a fifth example compressor system 422. The fifth example compressor system 422 comprises a compressor motor/generator 430 mechanically connected to a compressor 432 through a compressor clutch 436*a* and to a vehicle internal combustion engine 434 through an engine clutch 436*b*. The compressor system 422 that can be operated such that the compressor motor/generator 430 mechanically engages and operates the compressor 432 and/or such that the compressor motor/generator 430 generates electricity based on operation of the vehicle internal combustion engine 434. The compressor clutch 436*a* mechanically disengages a compressor motor/generator shaft 438 from the compressor 432 in one mode and mechanically engages the compressor motor/generator shaft 438 with compressor 432 in another mode. The engine clutch 436*b* mechanically disengages the compressor motor/generator shaft 438 from the vehicle combustion engine 434 in one mode and mechanically engages the compressor motor/generator shaft 438 with the vehicle combustion engine 434 in another mode.

The fifth example compressor system 422 forms a part of a heat pump system 440 further comprising a condenser coil 442, an expansion valve 444, and an evaporator coil 446. In addition to the fifth example compressor system 422, the fifth example vehicle heating, ventilating, and air conditioning system 420 further comprises an HVAC controller 450, a fan 452, and a HVAC user interface 454. The vehicle internal combustion engine 434 is mechanically connected to a vehicle charging system 460, and the vehicle charging system 460 supplies power to a vehicle battery 462 through a DC bus 464. Power to the compressor motor/generator 430 and the fan 452 may also be supplied from the vehicle charging system 430 through the DC bus 464. Electrical power generated by the compressor/motor generator 430 may be supplied to the DC bus 464.

VI. Sixth Example

Referring now to FIG. 6 of the drawing, depicted therein is a sixth example vehicle heating, ventilating, and air conditioning system 520 comprising a sixth example compressor system 522. The sixth example compressor system 522 comprises a compressor motor/generator 530 mechanically connected to a compressor 532 through a compressor clutch 536*a* and to a vehicle internal combustion engine 534 through an engine clutch 536*b*. The sixth example compressor system 522 can be operated in a first mode in which the compressor motor/generator 530 mechanically engages and operates the compressor 532 and in a second mode in which the compressor motor/generator 530 generates electricity based on operation of the vehicle internal combustion engine 534. The compressor clutch 536*a* mechanically disengages a compressor motor/generator shaft 538 from the compressor 532 in one mode and mechanically engages the compressor motor/generator shaft 538 with compressor 532 in another mode. The engine clutch 536*b* mechanically disengages the compressor motor/generator shaft 538 from the vehicle combustion engine 534 in one mode and mechanically engages the compressor motor/generator shaft 538 with the vehicle combustion engine 534 in another mode.

The sixth example compressor system 522 forms a part of a heat pump system 540 further comprising a condenser coil 542, an expansion valve 544, and an evaporator coil 546. In addition to the sixth example compressor system 522, the sixth example vehicle heating, ventilating, and air conditioning system 520 further comprises an HVAC controller 550, a fan 552, and a HVAC user interface 554. The vehicle internal combustion engine 534 is mechanically connected to a vehicle charging system 560, and the vehicle charging system 560 supplies power to a vehicle battery 562 through a DC bus 564. Power to the compressor motor/generator 530 and the fan 552 may also be supplied from the vehicle charging system 530 through the DC bus 564. Electrical power generated by the compressor/motor generator 530 may be supplied to the DC bus 564.

The sixth example vehicle heating, ventilating, and air conditioning system 520 further comprises an auxiliary power supply system 570 comprising an auxiliary battery 572, an auxiliary disconnect switch 574, and a vehicle disconnect switch 576. The sixth example vehicle heating, ventilating, and air conditioning system 520 may be operated based on electrical power generated by any one or any combination of the vehicle charging system 560, the vehicle battery 562, and the auxiliary battery 564 when the vehicle internal combustion engine 534 is not operating.

What is claimed is:

1. A heat pump method for a vehicle comprising a vehicle internal combustion engine, a vehicle heating and cooling system, and a DC bus, the method comprising the steps of:
    providing a compressor motor/generator defining a compressor motor/generator shaft;
    mechanically connecting a compressor to the compressor motor/generator shaft;
    mechanically connecting an engine clutch to the compressor motor/generator shaft and to the vehicle internal combustion engine;
    operatively connecting the compressor to a condenser coil, an expansion valve, and an evaporator coil to form the heat pump system;
    causing the vehicle internal combustion engine to operate the compressor motor/generator such that the compressor motor/generator applies power to the DC bus when the engine clutch operatively connects the compressor motor/generator shaft to the vehicle internal combustion engine; and
    causing the compressor motor/generator to operate the compressor based on power from the DC bus when the engine clutch disconnects the compressor motor/generator shaft from the vehicle internal combustion engine.

2. The method as recited in claim 1, further comprising the step of operatively connecting an auxiliary power supply system to the DC bus.

3. The method as recited in claim 1, further comprising the step of operatively connecting a compressor clutch between the compressor motor/generator shaft and the compressor.

4. The method as recited in claim 3, further comprising the step of operatively connecting an auxiliary power supply system to the DC bus.

* * * * *